(12) United States Patent
Evans

(10) Patent No.: US 9,047,225 B1
(45) Date of Patent: Jun. 2, 2015

(54) DYNAMIC SELECTION OF DATA REPLACEMENT PROTOCOL FOR CACHE

(71) Applicant: EMC Corporation, Hopkinton, MA (US)

(72) Inventor: T. David Evans, Rutland, MA (US)

(73) Assignee: EMC Corporation, Hopkinton, MA (US)

( * ) Notice: Subject to any disclaimer, the term of this patent is extended or adjusted under 35 U.S.C. 154(b) by 208 days.

(21) Appl. No.: 13/628,085

(22) Filed: Sep. 27, 2012

(51) Int. Cl.
G06F 12/00 (2006.01)
G06F 12/12 (2006.01)

(52) U.S. Cl.
CPC ............ *G06F 12/127* (2013.01); *G06F 12/121* (2013.01); *G06F 12/128* (2013.01); *G06F 12/12* (2013.01)

(58) Field of Classification Search
CPC .... G06F 12/127; G06F 12/128; G06F 12/121
USPC .................................................. 711/133, 134
See application file for complete search history.

(56) References Cited

U.S. PATENT DOCUMENTS 8,112,585 B2 * 2/2012 Patel et al. .................... 711/118

OTHER PUBLICATIONS

An et al., ACME: Adaptive Caching Using Multiple Experts, Workshop on Distributed Data & Structures 2002, pp. 143-158.*
Chen et al., Least-Squares SARSA (Lambda) Algorithms for Reinforcement Learnings, Fourth International Conference of Natural Computation, IEEE, 2008, pp. 632-636.*
Rummery et al., "On-Line Q-Learning Using Connectionist Systems," Cambridge University Engineering Department, England, Sep. 1994, 21 pages.
Sutton & Barto, "Reinforcement Learning: An Introduction," The MIT Press, Cambridge, MA, downloaded from http://webdocs.cs.ualberta.ca/~sutton/book/ebook/the-book.html, particularly section 7.5 "Sarsa," viewed at http"//webdocs.cs.ualberta.ca/!sutton/book/ebook/node77.html, downloaded on Oct. 1, 2012.

* cited by examiner

*Primary Examiner* — Aimee Li
*Assistant Examiner* — Edmund Kwong
(74) *Attorney, Agent, or Firm* — BainwoodHuang

(57) ABSTRACT

An improved technique for managing data replacement in a cache dynamically selects a data replacement protocol from among multiple candidates based on which data replacement protocol produces the greatest cache hit rate. The technique includes selecting one of multiple data replacement protocols using a random selection process that can be biased to favor the selection of certain protocols over others. Data are evicted from the cache using the selected data replacement protocol, and the cache hit rate is monitored. The selected data replacement protocol is then rewarded in response to the detected cache hit rate. The selection process is repeated, and a newly selected data replacement protocol is put into use. Operation tends to converge on an optimal data replacement protocol that best suits the application and current operating environment of the cache.

21 Claims, 3 Drawing Sheets

DYNAMIC SELECTION OF DATA REPLACEMENT PROTOCOL FOR CACHE

BACKGROUND

Computerized systems commonly include caches to provide efficient access to stored data. With a typical cache, selected data stored on slower media with higher capacity are loaded onto faster media with lower capacity. For example, data stored on a disk may be pre-fetched and brought into a portion of memory (a cache), where the data may be accessed quickly and efficiently by running programs.

Caches are typically operated at or near their full data capacity. Once a cache becomes full, new data cannot be added to the cache, e.g., in response to a pre-fetch operation, until other data are removed. Various protocols for removing data from a cache, i.e., "data replacement protocols," are known in the art, and include, for example, least recently used (LRU), first in first out (FIFO), random replacement, and relative distance to logical block address (LBA).

Because a cache stores much less data than the media it supports, access by running programs to desired data in the cache sometimes results in the desired data being found in the cache (a "cache hit") but sometimes results in the desired data being absent from the cache (a "cache miss").

SUMMARY

Data replacement protocols of conventional caches are typically hard-coded into the cache designs. For example, some caches are configured always to use FIFO whereas others are configured always to use LRU. It has been recognized, however, that the "hit rate" of a cache, i.e., the ratio of cache hits to the sum of cache hits and cache misses, depends strongly on the data replacement protocol in use by the cache and that the optimal data replacement protocol may change over time. Thus, LRU may result in the highest cache hit rate in some circumstances, whereas random data replacement may work best in other circumstances. Yet conventional approaches to managing caches do not typically adapt their data replacement protocols as circumstances change.

In contrast with the conventional approach, an improved technique for managing data replacement in a cache dynamically selects a data replacement protocol from among multiple candidates based on which data replacement protocol produces the greatest cache hit rate. The technique includes selecting one of multiple data replacement protocols using a random selection process that can be biased to favor the selection of certain protocols over others. Data are evicted from the cache using the selected data replacement protocol, and the cache hit rate is monitored. The selected data replacement protocol is then rewarded based on the detected cache hit rate, e.g., a biasing of the selection process is modified to change the likelihood that the selected data replacement protocol will again be selected in the future. The selection process is repeated, and a newly selected data replacement protocol is put into use. Each time a new selection is made, the cache hit rate is monitored and the selected protocol is rewarded in response to the cache hit rate. In this fashion, operation tends to converge on an optimal data replacement protocol that best suits the application and current operating environment of the cache.

In some examples, the biasing of the selection process includes limits that continue to allow relatively unrewarded data replacement protocols to be selected, at least some of the time. Previously unrewarded protocols can thus recover and become predominant if circumstances favor those protocols.

The improved technique can thus adapt over time to converge on different data replacement protocols under different circumstances.

Certain embodiments are directed to a method of managing data replacement in a cache. The method includes selecting, in accordance with a selection process, one of multiple data replacement protocols for evicting data from the cache. The selection process has a biasing that is adjustable to change the probability of selecting any of the data replacement protocols relative to the others. The method further includes evicting data from the cache using the selected data replacement protocol and detecting a hit rate of the cache in response to the selected data replacement protocol. The method still further includes adjusting the biasing of the selection process, in response to the detected hit rate of the cache after selecting the selected data replacement protocol, to vary the probability that the selected data replacement protocol will later be selected according to the selection process when subsequently selecting one of the data replacement protocols for evicting data from the cache.

In some examples, the hit rate of the cache is detected in response to individual read requests, such that a single cache hit is taken as a cache hit rate of 100% whereas a single cache miss is taken as a cache hit rate of 0%. In other examples, cache hits and misses are accumulated over a specified period of time or over a specified number of read requests and the hit rate of the cache is computed based on the accumulated results.

Other embodiments are directed to computerized apparatus and computer program products. Some embodiments involve activity that is performed at a single location, while other embodiments involve activity that is distributed over a computerized environment (e.g., over a network).

BRIEF DESCRIPTION OF THE SEVERAL VIEWS OF THE DRAWINGS

The foregoing and other features and advantages will be apparent from the following description of particular embodiments of the invention, as illustrated in the accompanying drawings, in which like reference characters refer to the same parts throughout the different views. In the accompanying drawings.

DETAILED DESCRIPTION OF THE INVENTION

Embodiments of the invention will now be described. It is understood that such embodiments are provided by way of example to illustrate various features and principles of the invention, and that the invention hereof is broader than the specific example embodiments disclosed.

An improved technique for managing data replacement in a cache dynamically selects a data replacement protocol from among multiple candidates based on which data replacement protocol produces the greatest cache hit rate. Operation tends to converge on an optimal data replacement protocol that best suits the application and operating environment of the cache.

Figure 1:
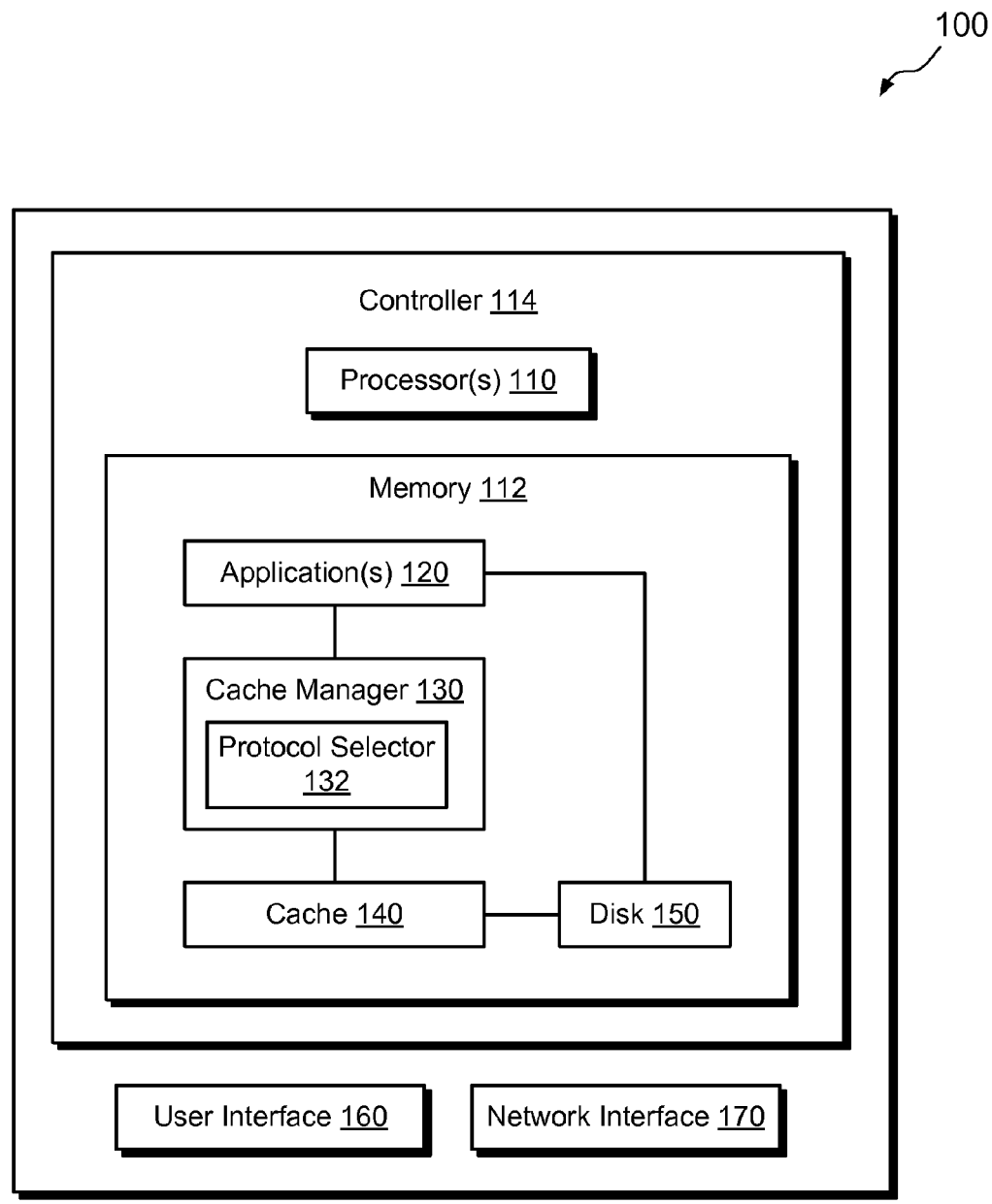
FIG. 1 is block diagram of example computing circuitry in which an improved technique for managing data replacement in a cache can be practiced.

FIG. 1 shows example computing circuitry 100 in which improved techniques for managing data replacement in a cache can be conducted. The computing circuitry 100 includes a set of processors 110 (e.g., one or more processing chips and/or assemblies), memory 112, a user interface 160, and a network interface 170. The set of processors 110 executing instructions stored in the memory 112 forms a controller 114, which is constructed and arranged for performing various processes described herein. The memory 112 includes both volatile and non-volatile memory. The memory 112 stores instructions for realizing one or more applications 120 and a cache manager 130. The cache manager 130 includes a protocol selector 132. The memory 112 also includes a cache 140 and a disk 150. It is understood that the memory 112 may store a myriad of other constructs; however, these are omitted from FIG. 1 for the sake of simplicity. In an example, the cache 140 is implemented in high-speed, volatile memory (e.g., RAM), which has a much smaller data storage capacity than the disk 150. The protocol selector 132 is arranged to dynamically select data replacement protocols based on a detected hit rate of the cache 140. Data stored in the cache 140 can be identified as distinct "pages." The act of reading data into the cache 140 is referred to as "Paging In," whereas the act of evicting data from the cache 140 is referred to as "Paging Out." The various elements of the computing circuitry 100 may be located at a single location or distributed across multiple locations, e.g., over a network.

In example operation, the cache 140 is configured as a read cache or as a read/write cache, i.e., one used for both read caching and write caching. Selected data are pre-fetched from the disk 150 and loaded into the cache 140. Data recently read from disk 150 are also typically stored in the cache 140, so that the data can be accessed again without undue delay. Once the cache 140 fills, it becomes necessary to evict some of the data stored in the cache 140 to make room for newly arriving data.

To evict data from the cache 140, the protocol selector 132 applies a random selection process to select one data replacement protocol from among multiple candidates. Although the selection process selects protocols randomly, the selection process can be biased such that certain protocols are more likely to be selected than others.

The cache manager 130 monitors the performance of the cache 140 operating with the selected data replacement protocol. If the hit rate of the cache 140 increases, the selected protocol is rewarded, such that the protocol selector 132 is more likely to select the selected protocol going forward. If the hit rate of the cache 140 decreases, the selected protocol may be "punished," i.e., made less likely to be selected by the protocol selector 132 going forward.

The acts of selecting a data replacement protocol, monitoring the cache hit rate, and rewarding or punishing the selected data replacement protocol are repeated over and over again, e.g., in a loop. In some examples, these acts are repeated each time data are evicted from the cache 140 (i.e., on each Page Out), or after some number of Page Outs or after some period of time. Over the course of many iterations, a particular data replacement protocol tends to be rewarded more than the others. As the most rewarded data replacement protocol also tends to be the one that is selected most often, operation tends to converge on the best data replacement protocol for the circumstances.

Figure 2:
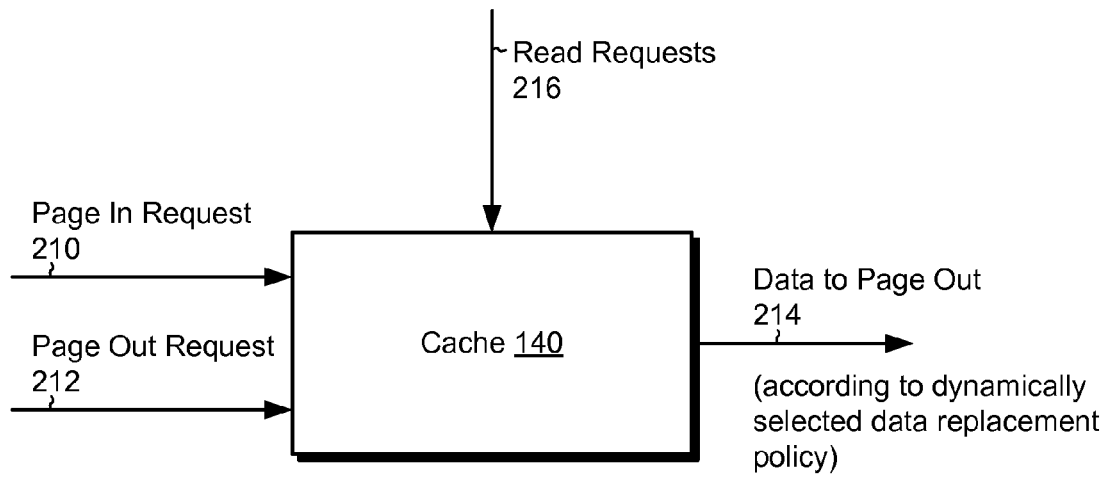
FIG. 2 is a block diagram of the cache of FIG. 1.

FIG. 2 shows additional aspects of the improved technique. Here, the cache 140 receives Page In requests 210 and Page Out requests 212. In an example, the Page In requests 210 and Page Out requests 212 are received from the cache manager 130. The Page In requests 210 specify pages of data that have been pre-fetched from the disk 150, pages of data that have recently been read from the disk 150, and/or pages of data to be written to the disk 150, for example. The Page Out requests 212 specify pages of data 214 to be evicted from the cache 140 in accordance with a selected data replacement protocol. The cache 140 also receives read requests 216 for obtaining data from the cache 140. The read requests 216 generally originate from the applications 120 and are provided to the cache 140 via the cache manager 130. Each of the read requests 216 includes a request to obtain particular data from the cache 140 and results in either a cache hit or a cache miss. Generally, once the cache 140 is full, each Page In request 210 is accompanied by a corresponding Page Out request 212. However, read requests 216 do not typically correspond in time with Page In requests 210 or Page Out requests 212.

Figure 3:
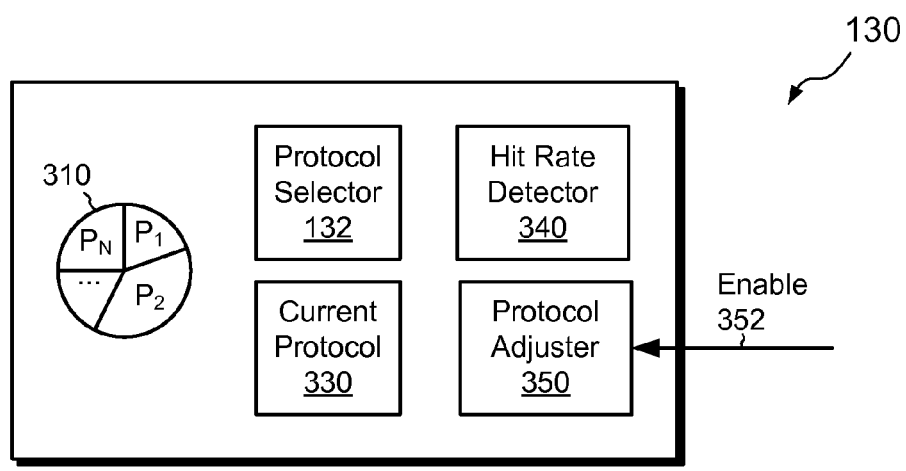
FIG. 3 is a block diagram of the cache manager of FIG. 1.

FIG. 3 shows additional example aspects of the cache manager 130. The cache manager 130 is seen to include the protocol selector 132, as well as a record 310 of data replacement protocols, a current protocol 330, a hit rate detector 340 and a protocol adjuster 350. The record 310 of data replacement protocols includes an entry for each of N data replacement protocols ($P_1$-$P_N$). The data replacement protocols $P_1$-$P_N$ may include, for example, least recently used (LRU), first in first out (FIFO), random replacement, relative distance to logical block address (LBA), and/or other data replacement protocols. Each of the data replacement protocols $P_1$-$P_N$ is associated with a weight. Protocols receiving more rewards than punishments tend to have larger weights, whereas protocols receiving fewer rewards than punishments tend to have smaller weights. Weights may be set with any suitable initial values. For instance, weights for all protocols may initially be set to be the same values or to random values.

In operation, the protocol selector 132 selects one of the data replacement protocols $P_1$-$P_N$ for evicting data from the cache 140. The selection process is random but has a biasing based on the weights associated with the different protocols. In an example, the probability of the protocol selector 132 selecting any given protocol is equal to the weight associated with that protocol divided by the sum of all the weights for all of the protocols.

The following example helps to illustrate the operation of the selection process employed by the protocol selector 132. In this particular example, it is assumed that there are four protocols and their weights are as follows:

| Protocol | Weight |
|---|---|
| $P_1$ | 50 |
| $P_2$ | 2000 |
| $P_3$ | 300 |
| $P_4$ | 70 |

Here, the probability of the protocol selector 132 selecting protocol $P_1$ is 50 divided by 2420 (the sum of the weights), or 0.021, the probability of selecting $P_2$ is 2000/2420, or 0.83, and so forth.

The protocol selector 132 may operate to select a data replacement protocol in any suitable way. In one example, the protocols are represented as contiguous ranges of weights, which span from 1 to 2420 (the sum of the weights). For instance, a range for $P_1$ extends from 1 to 50, a range for $P_2$ extends from 50 to 2050, a range for $P_3$ extends from 2050 to 2350, and a range for $P_4$ extends from 2350 to 2420. The protocol selector 132 calculates a random number between 1 and 2420. The protocol selector 132 then identifies the selected protocol as the one that corresponds to the range into which the calculated random number falls. Thus, if the random number is calculated to be 2101.5234, the protocol selector 132 selects protocol $P_3$, because 2101.5234 falls in the range assigned to $P_3$ (from 2050 to 2350).

The current protocol 330 stores the protocol most recently selected by the protocol selector 132. The current protocol 330 is then put into effect in evicting data from the cache 140. The hit rate detector 340 monitors cache hits and cache misses of the cache 140 with the selected protocol to compute a hit rate, and the protocol adjuster 350 adjusts the weights stored in the record 310 of data replacement protocols to dispense rewards and punishments based on whether the hit rate detector 340 observes an increase or decrease in the cache hit rate once the selected protocol is put into place.

The protocol adjuster 350 can apply rewards and punishments with any suitable timing. In one example, the protocol adjuster 350 applies a reward or punishment each time the hit rate detector 340 detects a cache hit or a cache miss. Thus, each time the hit rate detector 340 detects a cache hit, the protocol adjuster 350 rewards the currently selected data replacement protocol. Similarly, each time the hit rate detector 340 detects a cache miss, the protocol adjuster 350 punishes the currently selected data replacement protocol. In this arrangement, individual cache hits indicate a cache hit rate of 100%, albeit over a short interval, whereas individual cache misses indicate a cache hit rate of 0%.

In another example, rewards and punishments are dispensed less frequently, such as after each occurrence of some predetermined number of read requests 216. For example, the protocol adjuster 350 can keep track of cache hits and cache misses that accumulate over some number of read requests 216. After the predetermined number of read requests 216 occur, the protocol adjuster 340 applies rewards and punishments for all cache hits and cache misses that occur over the interval all at once.

In yet another example, the protocol adjuster 350 dispenses rewards and punishments each time the protocol selector 132 makes a new selection of a data replacement protocol. For instance, just prior to each selection by the protocol selector 132, the protocol adjuster 350 applies rewards and punishments for all accumulated cache hits and cache misses that have occurred since the previous protocol selection.

The administration of rewards and punishments themselves can be effected in a number of ways. In one example, a reward is implemented simply by adding a number (e.g., 1) to the weight associated with the selected protocol. A punishment can be similarly effected by subtracting the number from the associated weight. Alternatively, rewards and punishments can be implemented by increasing and decreasing weights associated with selected protocols by a percentage. For instance, rewards can each operate by increasing the weight of a selected protocol by 1%, whereas punishments can each operate by decreasing the weight by 1%.

Over time, for any given application and computing environment, it is expected that one of the data replacement protocols $P_1$-$P_N$ will come to predominate over the others. Over multiple iterations, operation will thus tend to converge on a particular protocol. Convergence maximizes use of the best data replacement protocol for the circumstances, but it can also prevent recovery and establishment of a new protocol if the circumstances change. For example, if the weight of one protocol is 1,000,000 and the weights of the others are all 0, the technique will not be able to recover and select a different protocol, even if new circumstances favoring the new protocol arise, as protocols with weights of 0 will never be selected.

In an example, the inability of the technique to adapt is avoided by limiting the minimum size of weights. For example, the protocol adjuster 350 may require no weight to fall below 5% of the sum of all the weights. Limiting the minimum weights in this way ensures that the technique can adapt as circumstances change. For example, a protocol that previously performed poorly can still be selected, at least some of the time, and can eventually come to predominate over the other protocols if it performs better than the other protocols.

In some implementations, it is desirable to prevent the protocol adjuster 350 from changing the weights of the data replacement protocols $P_1$-$P_N$. For example, the computing circuitry 100 may be subject at certain times to maintenance or other operations, during which time processing will be different from that which is normal for the computing circuitry 100. During these kinds of circumstances, it may be undesirable for the protocol adjuster 350 to change the weights of the protocols, as doing so could impair efficiency of the cache 140 once normal processing is resumed. In an example, the protocol adjuster 350 includes an input 352 for receiving an enable signal. When the enable signal is true, the protocol adjuster 350 operates normally, dispensing rewards and punishments to the protocols $P_1$-$P_N$ and thus allowing the weights of the protocols to change. But when the enable signal is false, the protocol adjuster 350 is disabled. No rewards or punishments are dispensed, and the weights of the protocols $P_1$-$P_N$ remain constant at their previously established levels. Thus, it is possible to selectively enable the protocol adjuster 350 for normal operation and to disable the protocol adjuster 350 for abnormal operation. It should be understood that the protocol adjuster 350 can also be disabled for applications in which performance of the cache 140 is not critical. Thus, the protocol adjuster 350 can be selectively turned on or off to optimize the choice of data replacement protocols around particular applications or use cases.

In some implementations, the cache manager 130 selects and rewards data replacement protocols according to a formal reinforcement learning technique. Many such techniques are known; however, we have recognized that the SARSA $\lambda$ technique is particularly well-suited for controlling the selection of data replacement protocols in a cache. SARSA is an acronym for State-Action-Reward-State-Action. A theoretical development of the SARSA $\lambda$ technique can be found in "Reinforcement Learning: An Introduction," by Richard S. Sutton and Andrew G. Barto, MIT Press, Cambridge, Mass., 1998.

According to an example SARSA $\lambda$ implementation, we define a state variable "s" as the percentage of cache hits rounded to the nearest integer. This gives us a total of 101 possible values of the variable s (0 to 100, inclusive).

Also, we define an action variable "a" as the selection of a data replacement protocol to be used in evicting data from the cache 140. Thus, if the record 310 of protocols identifies a total of N different protocols, we have a total of N possible values for the action variable a, one for each protocol. We can refer to each selection of a data replacement protocol as a "play."

Further, we define a state-action pair "(s, a)" as the concurrence of a particular cache hit rate (state) with a particular data replacement protocol selection (action). As there are 101 different states and N different actions, we have a total of 101*N unique state-action pairs. A policy "$\pi$" defines a mapping of each state-action pair (s, a) to the probability of taking an action while in the given state. Each state-action pair has a value, "$Q^\pi(s, a)$," which represents the average reward expected when taking action a in state s in accordance with the policy $\pi$.

A reward variable, "r," is assigned a value based on the hit rate that results from selection of a particular state-action pair. For example, r may assume the following values:
r=3 if the hit rate is 96% or higher;
r=2 if the hit rate is 90% to 95%;
r=1 if the hit rate is 50% to 89%;
r=0 if the hit rate is less than 50%.

Here, higher rewards are associated with higher cache hit rates and rewards taper to zero for hit rates less than 50%. It is understood that these particular reward values are merely examples and that rewards may be tailored as desired to suit each particular situation. For example, a 50% hit rate could be a good number for certain caches (e.g., where the cache is very small in relation to the media it supports). For such caches, it might be appropriate to reward strongly a 50% hit rate.

Various parameters may be tuned to affect the performance of the learning process. A learning rate "$\alpha$" is defined as a constant between zero and one that prescribes how much the value $Q^\pi(s, a)$ of a state-action pair is biased from the results of a single action. Higher learning rates enable a system to respond more quickly to changes than lower learning rates. A discount rate "Y" is defined as a constant between zero and one that prescribes the present value of future expected rewards. A discount rate of one means no discounting, whereas a discount rate of zero means that immediate rewards are maximized. As the discount rate approaches one, the technique becomes more farsighted and takes future rewards into account more strongly. A trace-decay "$\lambda$" is also defined as a constant between zero and one. In an example, the learning rate a is set to 0.1, the discount rate Y is set to 0.7, and the trace-decay $\lambda$ is set to 0.2. It is understood that these values are merely examples, and that different parameter values may be used to tune the learning process as desired.

A time displacement (TD) error $\delta$ drives all learning. For any given play, the TD error is updated by the following equation:

$$\delta_t = r_{t+1} + YQ(s_{t+1}, a_{t+1}) - Q(s_t, a_t)$$

Thus, the TD error for time t is the reward at time t+1 plus the discounted value of the state-action pair at time t+1 minus the value of the state-action pair time t.

Further, an eligibility trace "e(s, a)" is associated with each state-action pair. For each play, if a state is visited and an action is taken, the value of the eligibility trace for that state-action pair is incremented by one. Eligibility traces essentially keep track of state-action pairs that are eligible for updating. The eligibility trace for state s and action a at time t is denoted $e_t(s, a)$. All eligibility traces decay at a rate of $Y\lambda$. In mathematical terms, $$e_t(s,a) = Y\lambda e_{t-1}(s,a) \text{ for } s \neq s_t, a \neq a_t, \text{and}$$

$$e_t(s,a) = Y\lambda e_{t-1}(s,a) + 1, \text{otherwise.}$$

Using the definitions and parameters set forth above, a complete SARSA $\lambda$ implementation for selecting and rewarding data replacement protocols for the cache 140 can be realized with the following pseudo-code. In an example, this pseudo-code is executed by the constructs shown in FIG. 3.

{01} Initialize Q(s, a) to small numbers on the interval [−1, 1] using a random number generator for all states
{02} Initialize e(s, a) to 0 for all states
{03} Initialize s, a
{04} Repeat for each play
{05} Take action a, observe resultant state s' and reward r
{06} Choose a' using policy derived from Q
{07} $\delta$=r+YQ(s', a')−Q(s, a)
{08} e(s, a)=e(s, a)+1
{09} For all states s, actions a
{10} Q(s, a)=Q(s, a)+$\alpha\delta$e(s, a)
{11} e(s, a)=Y$\lambda$e(s, a)
{12} s=s'
{13} a=a'

At line 1 of the pseudo-code, each value of Q(s, a) is initialized to a random number between negative one and positive one. Assuming 101 possible states and N possible actions, line 1 involves initializing 101*N different values of Q(s, a). It should be noted that random initialization is merely an example. Alternatively, values of Q(s, a) can be initialized to predicted values, to values observed on earlier learning trials, or to other values.

At line 2 of the pseudo-code, all eligibility traces e(s, a) are initialized to zero. Using the numbers above, a total of 101*N values for eligibility traces are initialized.

At line 3, values of s and a are initialized. For example, a data replacement protocol (value of a) is chosen and the current cache hit rate (value of s) is observed.

Line 4 indicates a series of steps that are repeated for each play, i.e., for each selection of a data replacement protocol. At line 5, the action a (i.e., the data replacement protocol chosen at line 3) is selected and put into effect for evicting data from the cache 140. After a predetermined number of read requests 216 have occurred (or after some other defined interval), the hit rate detector 340 computes the hit rate of the cache 140 since the selection, i.e., that resulted from the action a. This hit rate is then taken as the resultant state, s'. It is noted that a particular reward r corresponds to the resultant state s'.

At line 6, a new action a' is chosen. For example, the protocol selector 132 selects a protocol for evicting data from the cache 140 using a random, biased selection process, similar to the one described above. As before, each protocol is assigned a weight. Here, the weight of each protocol "p" may be computed based on the sum of all $Q(s, a_p)$ across all values of s, where $a_p$ is the action of selecting the protocol p. The computed sums for each action are then used to weight the random, biased selection process as described in the previous example, such that protocols having higher weights will tend to be selected more often than protocols having lower weights. The probability of selecting any protocol p is thus proportional to the sum of all $Q(s, a_p)$ divided by the sum of all values of Q(s, a). According to one variant, the protocol having the highest weight is chosen for some fixed percentage of selections, while the random, biased selection process is used for the remainder of selections. In one example, the protocol having the highest weight is used for 70% of selections, with no variability, whereas random, biased selections are used for the remaining 30% of selections. Note that some of the random, biased selections will select the protocol having the highest weight, such that the total number of selections of the protocol with the highest weight is likely to be greater than 70%. The process of forcing the action with the highest weight to be selected for a high, fixed percentage of selections is known as "$\epsilon$-greedy" selection.

According to a further variant, the random, biased selection process is used for all selections, initially, but $\epsilon$-greedy selection is introduced after some initial learning period. Alternatively, fixed selections can be introduced at a low rate (e.g., for 10% of selections) after an initial learning period, and the rate can be increased over time. It is noted, however, that while an $\epsilon$-greedy process may improve efficiency under any given set of circumstances, it also impairs the ability of the technique to recover quickly and to select a new protocol if circumstances favoring the new protocol should arise. Thus, it is not expected that optimal implementations will employ fixed selections at a rate above 90%.

The TD error is computed at line 7, and the eligibility trace for the current state-action pair is incremented at line 8.

Line 9 indicates a series of steps that are repeated for all states and actions. At lines 10 and 11, each value Q(s, a) and each value of e(s, a) for all s and all a is updated as indicated.

At steps 12 and 13, the current state s is assigned the value of s' (the current hit rate), and the current action a is assigned the value of the most recent protocol selection, a'.

Control then returns to line 5, whereupon the action selected during the previous iteration of the loop is taken, i.e., the selected data replacement protocol is put into effect for evicting data from the cache 140. After a predetermined number of read requests 216 or after some other defined interval, the hit rate detector 340 computes the hit rate of the cache 140 since the prior selection, i.e., that resulted from the action a. This hit rate is then taken as the resultant state, s'. A reward r, which corresponds to the state s', is then applied. Operation continues in this matter indefinitely, with rewards steering future protocol selections toward more effective choices.

Figure 4:
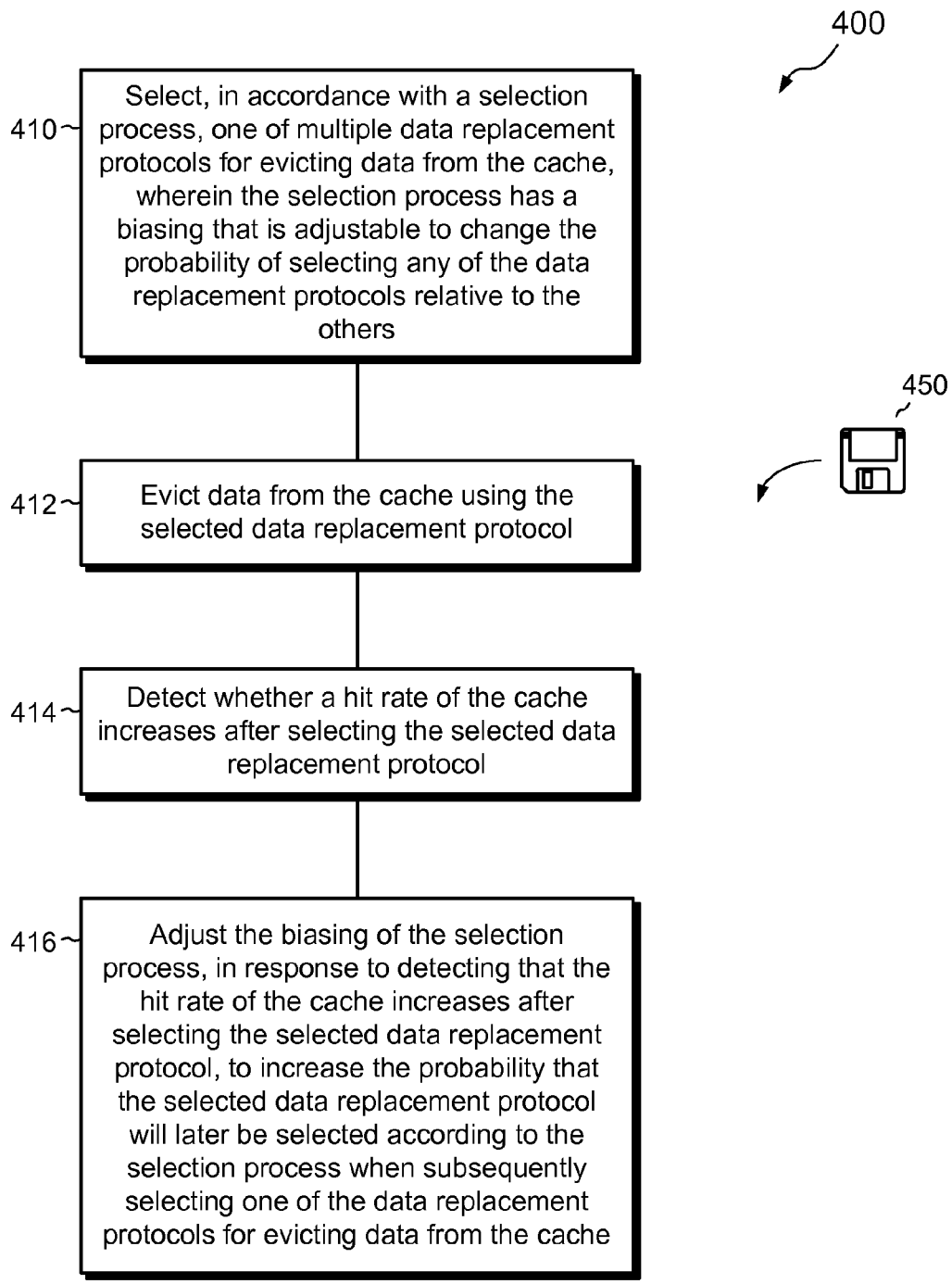
FIG. 4 is a flowchart showing an example process for managing data replacement in a cache, such as the one shown in FIG. 1.

FIG. 4 shows an example process 400 for managing data replacement in a cache. The process 400 is typically carried out by the constructs described in connection with FIGS. 1-3, which reside in the memory 112 of the computing circuitry 100 and is run by the set of processors 110. The various acts of the process 400 may be ordered in any suitable way. Accordingly, embodiments may be constructed in which acts are performed in orders different from those illustrated, which may include performing some acts simultaneously, even though the acts are shown as sequential in the illustrated embodiments.

At step 410, one of multiple data replacement protocols is selected for evicting data from a cache. For example, the protocol selector 132 selects one of the protocols $P_1$-$P_N$ for evicting data from the cache 140. The selection is made in accordance with a selection process having a biasing that is adjustable to change the probability of selecting any of the data replacement protocols relative to the others. For example, the data replacement protocols $P_1$-$P_N$ have weights that bias selection by the protocol selector 132 such that the protocol selector 132 is more likely to select protocols having higher weights than to select protocols having lower weights. In some examples, the protocol selector 132 selects the protocol having the highest weight a fixed percentage of the time (e.g., using an $\epsilon$-greedy selection process), and uses the random, biased selection process the remainder of the time.

At step 412, data are evicted from the cache using the selected data replacement protocol. For example, once the protocol selector 132 selects a data replacement protocol, the cache manager 130 evicts data from the cache 140 using the selected data replacement protocol. Thus, for instance, if the selected protocol is LRU, the cache manager 130 will evict data from the cache 140 using the LRU protocol.

At step 414, a hit rate of the cache is detected after selecting the selected data replacement protocol. For instance, the hit rate detector 340 detects whether a read request 216 results in a single cache hit or a single cache miss with the selected data replacement protocol. Alternatively (e.g., using the SARSA $\lambda$ technique), the hit rate detector 340 measures the hit rate of the cache 140 since the last protocol selection and determines whether the hit rate increases.

At step 416, the biasing of the selection process is adjusted, in response to the detected hit rate of the cache after selecting the selected data replacement protocol, to vary the probability that the selected data replacement protocol will later be selected according to the selection process when subsequently selecting one of the data replacement protocols for evicting data from the cache. In one example, the protocol adjuster 340 applies a reward to the selected protocol by increasing the weight associated with the selected protocol in the record 310 of data replacement protocols. As the weight of the selected protocol increases, the probability of the selected protocol being selected increases, so it is more likely to be selected going forward. In another example, values Q(s, a) of state-action pairs are updated in a SARSA $\lambda$ reinforcement learning implementation.

An improved technique has been described for managing data replacement in a cache. The improved technique dynamically selects a data replacement protocol from among multiple candidates based on which data replacement protocol produces the greatest cache hit rate. One of multiple data replacement protocols is selected using a random selection process that can be biased to favor the selection of certain protocols over others. Data are evicted from the cache using the selected data replacement protocol, and the cache hit rate is monitored. The selected data replacement protocol is rewarded in response to the detected cache hit rate. The selection process is repeated, and a newly selected data replacement protocol is put into use. Each time a new selection is made, the cache hit rate is monitored and the selected protocol is rewarded based on the detected cache hit rate. In this fashion, operation tends to converge on an optimal data replacement protocol that best suits the application and current operating environment of the cache.

As used throughout this document, the words "comprising," "including," and "having" are intended to set forth certain items, steps, elements, or aspects of something in an open-ended fashion. Although certain embodiments are disclosed herein, it is understood that these are provided by way of example only and the invention is not limited to these particular embodiments.

Having described certain embodiments, numerous alternative embodiments or variations can be made. For example, the cache 140 has been shown and described as being realized in volatile memory, for caching data stored on the disk 150. This is merely an example, however. Alternatively, the improved technique can be applied to caches in any part of a computing system. For instance, the improved techniques can be applied using a cache in faster memory for caching slower memory, in faster non-volatile memory (e.g., flash memory) for caching data in slower non-volatile memory (disk, tape, optical media, etc.), or for caching data between any two storage elements. The technique can be used with single level caches or multi-level caches. When used in multi-level caches, each cache level can be regarded as its own separate cache and the technique described herein can be performed independently at each cache level.

The improved technique can also be applied to caches that locally store data, which is obtained from another computer or group of computers operated elsewhere. For example, the improvements can be applied to caches of files or software objects downloaded from other computers, such as Internet servers, to avoid the need to download the files or software objects each time they are needed. The technique can also be applied to host computers connected to a storage array, where the hosts each maintain a local cache of data stored on the array.

Further, although features are shown and described with reference to particular embodiments hereof, such features may be included in any of the disclosed embodiments and their variants. Thus, it is understood that features disclosed in connection with any embodiment hereof can be included as variants of any other embodiment hereof, whether such inclusion is made explicit herein or not.

Further still, the improvement or portions thereof may be embodied as a non-transient computer-readable storage medium, such as a magnetic disk, magnetic tape, compact disk, DVD, optical disk, flash memory, Application Specific Integrated Circuit (ASIC), Field Programmable Gate Array (FPGA), and the like (shown by way of example as medium 450 in FIG. 4). Multiple computer-readable media may be used. The medium (or media) may be encoded with instructions which, when executed on one or more computers or other processors, perform methods that implement the various processes described herein. Such medium (or media) may be considered an article of manufacture or a machine, and may be transportable from one machine to another.

Those skilled in the art will therefore understand that various changes in form and detail may be made to the embodiments disclosed herein without departing from the scope of the invention.

What is claimed is:

1. A method of managing data replacement in a cache, comprising:
    selecting, in accordance with a selection process, one of multiple data replacement protocols for evicting data from the cache, wherein the selection process has a biasing that is adjustable to change the probability of selecting any of the data replacement protocols relative to the others;
    evicting data from the cache using the selected data replacement protocol;
    detecting a hit rate of the cache in response to the selected data replacement protocol; and
    adjusting the biasing of the selection process in response to the detected hit rate of the cache after selecting the selected data replacement protocol, to vary the probability that the selected data replacement protocol will later be selected according to the selection process when subsequently selecting in one of the data replacement protocols for evicting data from the cache,
    wherein the acts of selecting and adjusting are conducted in accordance with a SARSA (State-Action-Reward-State-Action) λ reinforcement learning technique, wherein the SARSA λ reinforcement learning technique defines multiple state-action pairs, wherein each state-action pair is a concurrence of a particular cache hit rate (state) with a particular data replacement protocol selection (action).

2. The method of claim 1, wherein detecting the hit rate of the cache in response to the selected data replacement protocol includes detecting a single cache hit or a single cache miss.

3. The method of claim 1, wherein detecting the hit rate of the cache in response to the selected data replacement protocol includes accumulating numbers of cache hits and cache misses over a designated interval of time and computing the hit rate based on the accumulated numbers of cache hits and cache misses.

4. The method of claim 1, wherein detecting the hit rate of the cache in response to the selected data replacement protocol includes accumulating numbers of cache hits and cache misses over a designated number of read requests and computing the hit rate based on the accumulated numbers of cache hits and cache misses.

5. The method of claim 1, wherein the selection process operates in a random, biased manner wherein each of the data replacement protocols is associated with a weight, and wherein the probability of selecting any of the data replacement protocols when selecting a data replacement protocol is proportional to the weight of the respective data replacement protocol divided by the sum of the weights of all of the data replacement protocols.

6. The method of claim 5, wherein adjusting the biasing of the selection process includes changing the weight of the selected data replacement protocol in response to detecting that the hit rate of the cache changes after selecting the selected data replacement protocol.

7. The method of claim 6, further comprising:
    receiving multiple data replacement requests to evict data from the cache; and
    repeating the selecting of one of the data replacement protocols each time a particular number of data replacement requests is received.

8. The method of claim 7, wherein the number of data replacement requests is one.

9. The method of claim 7, further comprising receiving multiple read requests for data from the cache, wherein adjusting the biasing of the selection process is repeated each time a particular number of read requests for data from the cache is received.

10. The method of claim 9, wherein the number of read requests for data from the cache is one.

11. The method of claim 6, wherein changing the weight of the selected data replacement protocol includes ensuring that the probability of selecting any of the data replacement protocols does not fall below a lower limit greater than zero.

12. The method of claim 1, wherein adjusting the biasing of the selection process includes applying a reward to the selected data replacement protocol, and wherein the reward applied is greater when detecting a higher hit rate than when detecting a lower hit rate.

13. Computing circuitry for managing data replacement in a cache, comprising:
    a set of processors; and
    memory, coupled to the set of processors, the memory constructed and arranged to store instructions executable by the set of processors,
    wherein the set of processors executing instructions from the memory forms a controller constructed and arranged to:
        select, in accordance with a selection process, one of multiple data replacement protocols for evicting data from the cache, wherein the selection process has a biasing that is adjustable to change the probability of selecting any of the data replacement protocols relative to the others;
        evict data from the cache using the selected data replacement protocol;
        detect a hit rate of the cache in response to the selected data replacement protocol; and
        adjust the biasing of the selection process, in response to the detected hit rate of the cache after selecting the selected data replacement protocol, to vary the probability that the selected data replacement protocol will later be selected according to the selection process when subsequently selecting one of the data replacement protocols for evicting data from the cache,
    wherein, the controller is constructed and arranged to select and adjust in accordance with a SARSA (State-Action-Reward-State-Action) λ reinforcement learning technique, wherein the SARSA λ reinforcement learning technique defines multiple state-action pairs, wherein each state-action pair is a concurrence of a particular cache hit rate (state) with a particular data replacement protocol selection (action).

14. The computing circuitry of claim 13, wherein the controller is constructed and arranged to operate the selection process in a random, biased manner wherein each of the data replacement protocols is associated with a weight, and wherein the probability of selecting any of the data replacement protocols when selecting a data replacement protocol is proportional to the weight of the respective data replacement protocol divided by the sum of the weights of all of the data replacement protocols.

15. The computing circuitry of claim 14, wherein when the controller is constructed and arranged to adjust the biasing of the selection process, the controller is further constructed and arranged to increase the weight of the selected data replacement protocol in response to detecting that the hit rate of the cache increases after selecting the selected data replacement protocol.

16. A non-transitory computer-readable medium including instructions which, when executed by a set of processors of computing circuitry, cause the set of processors to perform a method for managing data replacement in a cache, the method comprising:
    selecting, in accordance with a selection process, one of multiple data replacement protocols for evicting data from the cache, wherein the selection process has a biasing that is adjustable to change the probability of selecting any of the data replacement protocols relative to the others;
    evicting data from the cache using the selected data replacement protocol;
    detecting a hit rate of the cache in response to the selected data replacement protocol; and
    adjusting the biasing of the selection process, in response to the detected hit rate of the cache after selecting the selected data replacement protocol, to vary the probability that the selected data replacement protocol will later be selected according to the selection process when subsequently selecting one of the data replacement protocols for evicting data from the cache,
    wherein the acts of selecting and adjusting are conducted in accordance with a SARSA (State-Action-Reward-State-Action) λ reinforcement learning technique, wherein the SARSA λ reinforcement learning technique defines multiple state-action airs, wherein each state-action pair is a concurrence of a particular cache hit rate (state) with a particular data replacement protocol selection (action).

17. The non-transitory computer readable medium of claim 16, wherein the selection process operates in a random, biased manner wherein each of the data replacement protocols is associated with a weight, and wherein the probability of selecting any of the data replacement protocols when selecting a data replacement protocol is proportional to the weight of the respective data replacement protocol divided by the sum of the weights of all of the data replacement protocols.

18. The non-transitory computer readable medium of claim 17, wherein adjusting the biasing of the selection process includes increasing the weight of the selected data replacement protocol in response to detecting that the hit rate of the cache increases after selecting the selected data replacement protocol.

19. The non-transitory computer readable medium of claim 18, wherein adjusting the biasing of the selection process includes limiting changes to the weights of the data replacement protocols to ensure that the probability of selecting any of the data replacement protocols does not fall below a lower limit greater than zero.

20. The method of claim 1, where each state-action pair has a value, "$Q^{\pi}(s, a)$," which represents the average reward expected when taking action a in state s in accordance with the policy π, wherein the policy "π" defines a mapping of each state-action pair (s, a) to the probability of taking an action while in the given state.

21. The method of claim 7, further comprising:
    receiving an enable signal; and
    adjusting the biasing of the selection process each time that the particular number of data replacement requests is received when the enable signal is true, and
    keeping the biasing of the selection process constant each time the particular number of data replacement requests is received when the enable signal is false,
    wherein adjusting the biasing of the selection process is performed when the enable signal is true, and wherein adjusting the biasing of the selection process is not performed when the enable signal is false.

* * * * *